J. M. HORN.
HORSESHOE.
APPLICATION FILED DEC. 11, 1919.

1,357,399.

Patented Nov. 2, 1920.

Witness:
Adelaide Kearns.

Inventor:
J. M. Horn;
By Robert W. Randle,
Attorney.

UNITED STATES PATENT OFFICE.

JEREMIAH M. HORN, OF RICHMOND, INDIANA.

HORSESHOE.

1,357,399.      Specification of Letters Patent.      Patented Nov. 2, 1920.

Application filed December 11, 1919. Serial No. 344,061.

*To all whom it may concern:*

Be it known that I, JEREMIAH M. HORN, a citizen of the United States, residing in the city of Richmond, in the county of Wayne, State of Indiana, have invented certain new and useful Improvements in Horseshoes, of which the following is a full, clear, and comprehensive specification and exposition, the same being such as will enable others to make and use the same with exactitude.

The object of my present invention, broadly speaking, is to provide an expansible horseshoe, with means for its permanent attachment, also having means whereby it may be quickly and easily attached and detached for transient use, the same being simple in construction, easily operated, efficient in operation and which can be manufactured and sold at a comparatively low price.

It is well known that a one-piece metal shoe nailed to an animal's hoof soon tends to clamp, as the hoof grows or expands, thereby causing the animal to become lame, but my construction permits the hoof to expand naturally, whereby the shoe can be left on for an indefinite length of time. Also my construction permits a shoe of a certain size to fit hoofs of various sizes, that is to say, my shoe may be adjusted to various size hoofs. Also it is well known that frequently it is desirable to have the shoe attached for only a short time, or it may be desired to change a shoe for a short time, as when the roadway is slick with ice, therefore I provide for quickly attaching and detaching the shoe.

Other objects and advantages of the invention will be brought out in the course of the following description.

Figure 1:
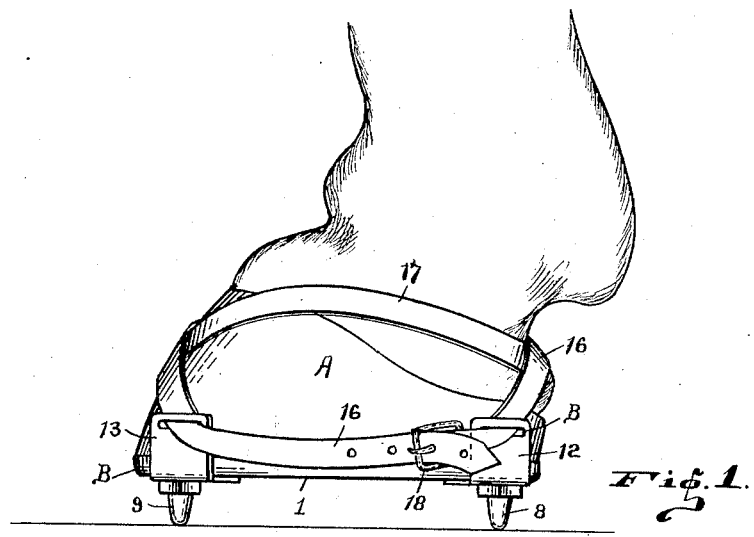
Figure 2:
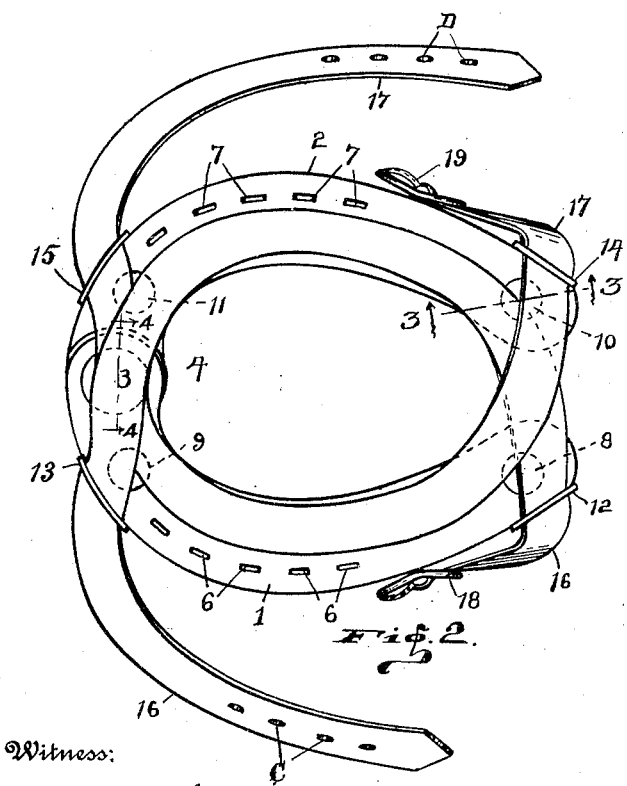
Figure 3:
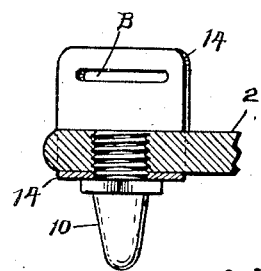
Figure 4:
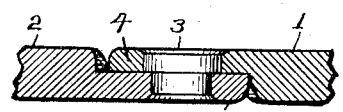

The preferred means for carrying out the principles of my invention in a practical manner is shown in the accompanying drawings, in which—Figure 1 is a side elevation of a horse's foot, showing my invention attached thereto in operative condition; Fig. 2 is a top plan view of the invention alone; Fig. 3 is a detail cross-section as taken through one of the calks, as for instance on the line 3—3 of Fig. 2, but without showing the straps; and Fig. 4 is a cross-section of the hinge joint, as taken on the line 4—4 of Fig. 2.

Similar indices denote like parts throughout the several views. In order that the construction, the operation, and the advantages of the invention may be better understood and appreciated, I will now take up a detailed description thereof, in which I will set forth the invention as fully and as comprehensively as I may.

Referring now to the drawings in detail: Letter A denotes the hoof of a horse's foot. The shoe proper comprises two segmental members 1 and 2, which are identical with each other except that they are oppositely disposed, the same being halved together at the toe by means of the hinge members 4 and 5, and they are pivotally connected by the compound rivet 3, one portion of which is of larger diameter than the other portion, and the rivet apertures in the members 4 and 5 are of different diameters with relation to each other, their sizes being such as to receive the larger and the smaller portions, respectively, of the rivet 3. The outer ends of said apertures in the members 4 and 5 are countersunk, and the ends of said rivet are expanded to fill the said countersunk ends of said apertures, thereby forming a permanent hinge, by which the heel parts of the members 1 and 2 may be swung toward and away from each other as desired to vary the size of the shoe.

Nail apertures 6 are formed through the member 1; and nail apertures 7 are formed through the member 2.

Near the heel and the toe portions of the member 1 are threaded apertures to receive the stem of each of one of the calks 8 and 9 which project below the member 1. Likewise near the heel and the toe portions of the member 2 are threaded apertures to receive the stem of one of the calks 10 and 11 which project below the member 2, all of said calks being identical with that shown in Fig. 3.

Four angle-clips 12, 13, 14 and 15 are provided, one to be employed in connection with each of the calks, 9, 10 and 11, respectively, and they are secured in place by said calks, as shown. One portion of each of said clips contacts with the underside of the shoe, with an aperture therethrough for the threaded stem of the calk, whereby when the calk is run in tight the clip will be rigidly secured in place. The other portion of each clip extends vertically at right-angles to the secured portion, and a horizontal slot B is formed through the upper portion of each of the clips, as shown in Fig. 3.

Said clips have two functions: They form guards to retain the hoof A in place on the shoe; and they afford means for the attachment of the retaining straps, as hereinafter explained.

Two retaining straps 16 and 17 are provided, each being provided with a buckle on one end thereof, as the buckles 18 and 19 respectively; and the other end portion of the straps are provided with apertures C and D to receive the tongues of the buckles.

Operation: Suppose now that the straps are removed. It is evident that the shoe may be applied to the hoof A in the usual manner, that is by driving nails through the apertures 6 and 7 and into the hoof A. With my construction it is evident that the shoe can be expanded or contracted to fit the hoof, and then after the shoe is applied it is evident that the hoof may expand or contract without making the animal lame, as the shoe may adjust itself to such conditions without being removed from the hoof.

It is sometimes desirable that a shoe be attached for only a short time, as on an icy morning, in that event it would not be practical to permanently secure the shoe as by nails as stated, therefore the shoe may be secured by said straps, temporarily, as follows: The strap 16 is run through the slot B of the clip 12, then back around the heel of the animal's foot, then around the opposite side of the hoof, then through the slot B of the clip 13, and then to the buckle 18 where it is tightened and secured as shown. The strap 17 is arranged reversely to the former, that is it is first run through the slot B of the clip 14, then back of the heel of the foot, then around the opposite side of the hoof and through the slot B of the clip 15, and then to the buckle 19 where it is tightened and secured as shown.

It is evident that when the straps are tightened the shoe will be engaged with the hoof with the clips preventing the hoof from slipping on the shoe, thereby providing a very efficient temporary securing means for the shoe.

I desire that it be understood that various changes may be made in the several details of construction and in the application of the invention without departing from the spirit of the invention and without sacrificing any of the advantages thereof.

Having now fully shown and described my invention, what I claim and desire to secure by Letters Patent of the United States, is—

1. A horseshoe comprising two main members, with said members halved together at the toe, a rivet pivotally connecting the halved portion whereby the shoe may be expanded and contracted, detachable calks secured in and projecting below each main member, an angular clip secured by each of said calks with a slot formed through the upper portion of each clip, straps threaded through said slots and adapted to encircle the hoof of an animal, and means for detachably securing together the ends of said straps.

2. A horseshoe pivoted at the toe forming two main members, means for permanently securing the shoe to an animal's hoof, angular clips secured to the shoe and extending upwardly with a slot formed through the upper portion of each clip, a pair of straps threaded through said slots and encircling the hoof, and buckles for securing together the ends of said straps.

In testimony whereof I have hereunto subscribed my name to this specification in the presence of two subscribing witnesses.

JEREMIAH M. HORN.

Witnesses:
 ROBT. W. RANDLE,
 R. E. RANDLE.